US008752772B2

(12) United States Patent
Schumacher et al.

(10) Patent No.: US 8,752,772 B2
(45) Date of Patent: Jun. 17, 2014

(54) SYSTEM FOR TARGETED LOCAL AIR HUMIDIFICATION

(75) Inventors: Christian Schumacher, Wedel (DE); Walter Kulcke, Jork (DE); Karin Thudt, Taufkirchen (DE); Robert Schreiber, Graefelfing (DE)

(73) Assignee: Airbus Operations GmbH, Hamburg (DE)

( * ) Notice: Subject to any disclaimer, the term of this patent is extended or adjusted under 35 U.S.C. 154(b) by 693 days.

(21) Appl. No.: 13/057,108

(22) PCT Filed: Jul. 30, 2009

(86) PCT No.: PCT/EP2009/005535
§ 371 (c)(1),
(2), (4) Date: Mar. 29, 2011

(87) PCT Pub. No.: WO2010/015361
PCT Pub. Date: Feb. 11, 2010

(65) Prior Publication Data
US 2011/0180618 A1     Jul. 28, 2011

Related U.S. Application Data

(63) Continuation of application No. PCT/EP2009/005535, filed on Jul. 30, 2009.

(60) Provisional application No. 61/086,209, filed on Aug. 5, 2008.

(30) Foreign Application Priority Data

Aug. 5, 2008   (DE) .................. 10 2008 036 425

(51) Int. Cl.
*G05D 22/00*     (2006.01)

(52) U.S. Cl.
USPC ................ 236/44 C; 62/176.6; 62/DIG. 5

(58) Field of Classification Search
USPC ...... 236/44 A, 44 C; 62/176.1, 176.6, DIG. 5
See application file for complete search history.

(56) References Cited

U.S. PATENT DOCUMENTS

| 5,037,585 A | 8/1991 | Alix et al. |
| 5,595,690 A | 1/1997 | Filburn et al. |
| 5,791,982 A * | 8/1998 | Curry et al. ............ 454/74 |

(Continued)

FOREIGN PATENT DOCUMENTS

| CA | 2711701 | 7/2009 |
| DE | 102004024615 | 12/2005 |

(Continued)

OTHER PUBLICATIONS

European Patent Office, International Search Report, Form PCT/ISA/210 (4 pgs.), May 6, 2010, and PCT form PCT/ISA/237 (7 pgs.).

*Primary Examiner* — Marc Norman
(74) *Attorney, Agent, or Firm* — Wood, Herron & Evans, LLP

(57) ABSTRACT

In order to increase the air humidity in a cabin region of an aircraft equipped with a plurality of seats, a device includes a plurality of humidifying units each arranged in spatial association with a partial number of the seats and a plurality of outlet openings. The humidifying units are each designed to enrich a supplied air stream with gaseous water. The outlet openings are designed to emit the air streams enriched by the humidifying units into the cabin region, such that a partial number of the outlet openings each receive one of the enriched air streams. The air temperature of the enriched air streams is controlled so that the local temperature in a target region served by the humidifying unit does not fall below a dew point.

15 Claims, 2 Drawing Sheets

(56) References Cited

U.S. PATENT DOCUMENTS

Figure 1:
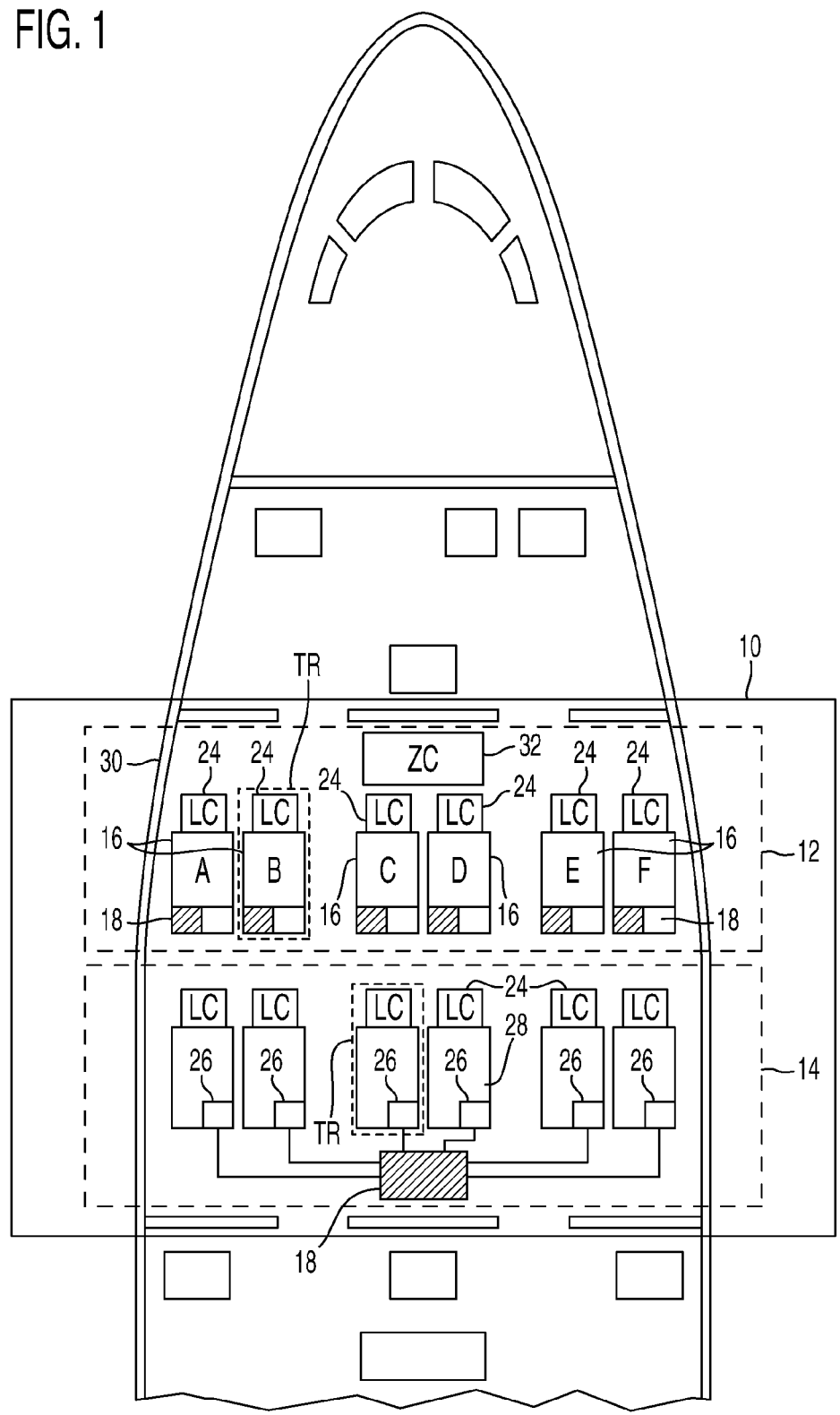

| | | | |
|---|---|---|---|
| 5,806,762 A * | 9/1998 | Herr et al. | 236/44 A |
| 5,944,284 A | 8/1999 | Bardel | |
| 6,099,404 A * | 8/2000 | Hartenstein et al. | 454/157 |
| 7,112,770 B2 * | 9/2006 | Doh et al. | 219/682 |
| 2007/0144726 A1 * | 6/2007 | Scherer et al. | 165/203 |
| 2007/0245751 A1 | 10/2007 | Kulcke et al. | |
| 2008/0006740 A1 | 1/2008 | Cremers et al. | |
| 2008/0053126 A1 | 3/2008 | Ebigt et al. | |
| 2009/0193814 A1 * | 8/2009 | Lofy | 62/3.61 |

FOREIGN PATENT DOCUMENTS

| | | |
|---|---|---|
| DE | 102005029226 | 12/2006 |
| DE | 102006031361 | 1/2008 |
| DE | 102006041030 | 3/2008 |
| DE | 102008004695 | 7/2009 |

* cited by examiner

SYSTEM FOR TARGETED LOCAL AIR HUMIDIFICATION

This application claims priority, under Section 371 and/or as a continuation under Section 120, to PCT Application No. PCT/EP2009/005535, filed on Jul. 30, 2009, which claims priority to German Application No. 10 2008 036 425.8 and also to U.S. Provisional Application No. 61/086,209, both filed on Aug. 5, 2008.

TECHNICAL FIELD

The invention relates to a device for air humidification in an aircraft. In particular, the invention relates to a device of modular construction for targeted local air humidification in a cabin region of an aircraft.

BACKGROUND

At typical flight altitudes of commercial or transport aircraft, pressure and temperature are lower than acceptable for a cabin region. Pressure-controlled cabins with global air conditioning systems belong to the prior art. By restricting the air conditioning of the cabin region to temperature adjustment, the air humidity during the flight can fall to very low values of a few per cent relative air humidity, for example 3-5%. The comfort of persons on board who spend quite a long time in this dry atmospheric environment is considerably reduced, since the low air humidity is felt to be unpleasant.

Besides the temperature control, known global air conditioning systems allow a humidification of the entire cabin air, so that a relative air humidity of, for example, 30-50% is established. As a result, a more pleasant atmospheric environment can be produced and thus the comfort on board increased.

An appropriate solution is described in the patent U.S. Pat. No. 5,595,690. There, membrane sheets are proposed for the central humidification. Since the required exchange area for a centralised solution is correspondingly large, the flat, extended design has proved to be disadvantageous on integration in the aircraft. Furthermore, a humidification of the entire cabin air involves increased energy expenditure and water tanks of corresponding size, and thus the proposed solution results in increased flying weight and fuel consumption of the aircraft. In addition, the membrane modules dry after the system is switched off, and the contraction of the membrane as it dries out causes considerable mechanical stresses on the membrane module frame. Depending on the type of connection and seal between adjacent sheets of the sheet membrane module, deformations due to the mechanical stress can cause leakage of the module.

A further disadvantage of a global or centralised humidification of the cabin air is the danger of undesired condensation, in particular in the vicinity of structural parts of the aircraft which are relatively cold in flight. Corrosion, malfunctions, weight increase due to water stored in the insulation or reduction of insulating properties may result from the formation of the condensate.

Solutions for local humidification are also known, for example, from laid-open application DE 10 2004 024 615 A1. There, spraying methods are used for local humidification. As a result, the air humidity can be increased in a targeted manner in partial regions of the cabin, without causing condensation on more remote, cooler insulation and structural parts of the aircraft. The disadvantage, however, is that owing to the spraying method the water supplied to an air stream to be humidified is supplied at least largely in liquid form. As a result, air containing a large number of small liquid drops, i.e. aerosols, is expelled into the cabin. The liquid drops entering the cabin region are generally felt by the cabin occupants to have an adverse effect on comfort. Furthermore, the danger of transmitting germs in breathing air increases due to the aerosols.

An object of the present invention is to ensure a high degree of climatic comfort for is persons on board, while maintaining efficient and safe flying operation.

SUMMARY OF THE INVENTION

To achieve this object, according to the invention a device for increasing the air humidity in a cabin region of an aircraft equipped with a plurality of seats is provided. The device comprises a plurality of humidifying units which are arranged in each case in spatial association with in each case a partial number of the seats and which are in each case designed to enrich a supplied air stream with gaseous water. The device further comprises a plurality of outlet openings which are designed to emit the air streams enriched by the humidifying units into the cabin region, in each case a partial number of the outlet openings each receiving one of the enriched air streams.

The term "seat" herein is to be understood generally in the sense of a place at which to dwell or region to pass through in the cabin region. For example, the place at which to dwell can include a bar in a lounge.

As a result of the air streams enriched with gaseous water, aerosol formation is limited to a degree imperceptible by cabin occupants. The danger of germ transmission associated with aerosol formation is minimised. Owing to the large number of humidifying units which are in each case assigned to a partial number of the seats, a modular construction of the device is enabled. In particular, the demand for humidifying units can be adapted to an actual demand. Associated with this is efficient utilisation of the flying weight and on-board resources, such as water and energy, and thus also a reduction of the fuel consumption. Since in each case a partial number of the outlet openings each receive one of the air streams enriched by one of the humidifying units, a plurality of sub-units can be autonomously operated, such a parallel operation ensuring flexibility and reliability.

At least some of the humidifying units can in each case be arranged in or on one of the seats. This may be advantageous for a variable design of the interior finish of the cabin, since complex installation steps for the humidifying units when changing the seat arrangement are avoided.

Also, at least some of the outlet openings can be arranged on one of the seats or in a surrounding area accessible to one of the seats by convection. As a result, efficient use of the humidified air for increasing comfort can be achieved, while a lower relative air humidity prevails at more remote components of the aircraft, so that a danger of condensation can be minimised.

Preferably, in each case a partial number of the humidifying units are each assigned a water reservoir, from which the humidifying unit concerned can draw water for enriching its air stream. As a result of a decentralised water supply, an autonomous or modular construction of the device for increasing the air humidity also with regard to the water supply can be achieved.

At least some of the water reservoirs can be arranged in each case preferably removably in or on one of the seats. As a result, the flexibility of the modular construction can be advantageously extended. Furthermore, it is advantageous to embody a removable water reservoir, for example, as a sterilely filled and/or disinfectible water bottle. The water filled into the disinfectible water bottle can be disinfected before filling. As a result, complex water treatment on board the aircraft can be avoided, and the danger of spreading germs due to contaminated water can be minimised. A preferred use of demineralised water can additionally be an increase of the service life of the humidifying units, since a deposit, for example of lime, can be considerably lessened and also maintenance expenditure reduced. Furthermore, as a result of a local water supply, the connection to an aircraft supply system for fresh water and where appropriate also drainage can be avoided. In addition, pumping of quite large amounts of water through the aircraft can be avoided and an accompanying safety risk eliminated. Owing to an elevated position of the water reservoir, it is additionally possible to ensure water conveyance from the water reservoir to the humidifying unit by gravitational force, so that a pump can be completely dispensed with.

Furthermore, in each case a partial number of the humidifying units can each be assigned a blower which serves for generating the air stream supplied to the humidifying unit concerned. Preferably, at least some of the blowers are also arranged in each case in or on one of the seats.

With regard to the outlet openings, at least some of them can preferably be individually positioned, individually oriented or are equipped with in particular controlled actuating means, which adjust the position or orientation of at least one of the outlet openings automatically to a position of a backrest of one of the seats. As a result, both the comfort can be further increased and resource-efficient use of a humidified air stream can be achieved.

The device for increasing the air humidity can comprise in particular heating means for heating the supplied air stream, the enriched air stream or the supplied water. Interaction of a plurality of heating means for heating one or more of the aforementioned phases is also conceivable. As a result, besides the increased air humidity, a high degree of thermal comfort for persons on board can be ensured. In addition, it is conceivable to use heating means to kill germs in the water, in order to prevent a risk of infection.

By using sensor means, one or a combination of the variables temperature, air humidity, flow rate, pressure and oxygen content can be detected and optionally displayed by display instruments. In particular, the supplied air stream, the enriched air stream, an air stream at one of the outlet openings, supplied water or air in a surrounding area accessible to one of the seats by convection can be metrologically detected.

A first control unit can be designed to compare at least one detected variable with at least one preset variable. In the event of a deviation, the first control unit can counteract the deviation by regulating at least one of the humidifying units and/or by regulating the heating means. In this case, it is conceivable to arrange the control unit in spatial association with the humidifying unit concerned. In particular, the first control unit can be integrated in at least a partial number of the seats. Furthermore, input means for inputting the at least one preset variable can be mounted on at least a partial number of the seats.

Furthermore, the first control unit can be configured for data communication with a separate second control unit. The second control unit can serve for controlling air conditioning means for air conditioning supply air blown into the cabin region, this air constituting a separate air supply from the enriched air streams. The first control unit can be designed to transmit the at least one detected variable and/or the at least one preset variable to the second control unit.

Additionally or alternatively, through the data communication the first control unit can receive from the second control unit measured and/or desired values concerning the air conditioning of the supply air. Furthermore, the first control unit can correct the at least one preset variable in dependence on the values received from the second control unit. For example, the at least one preset variable for the first control unit can be matched to the second control unit. It is thereby possible to prevent, for example, separate air conditioning means from working against one another due to deviating presettings with regard to temperature and/or air humidity. The matching can be effected dynamically, i.e. a reaction of the first control unit is more pronounced for greater deviations than for small ones.

It is also conceivable for the second control unit on the basis of the transmitted at least one detected and/or preset variable to correct its desired value. The said corrections can advantageously result in the increase of the energy efficiency.

Figure 2:
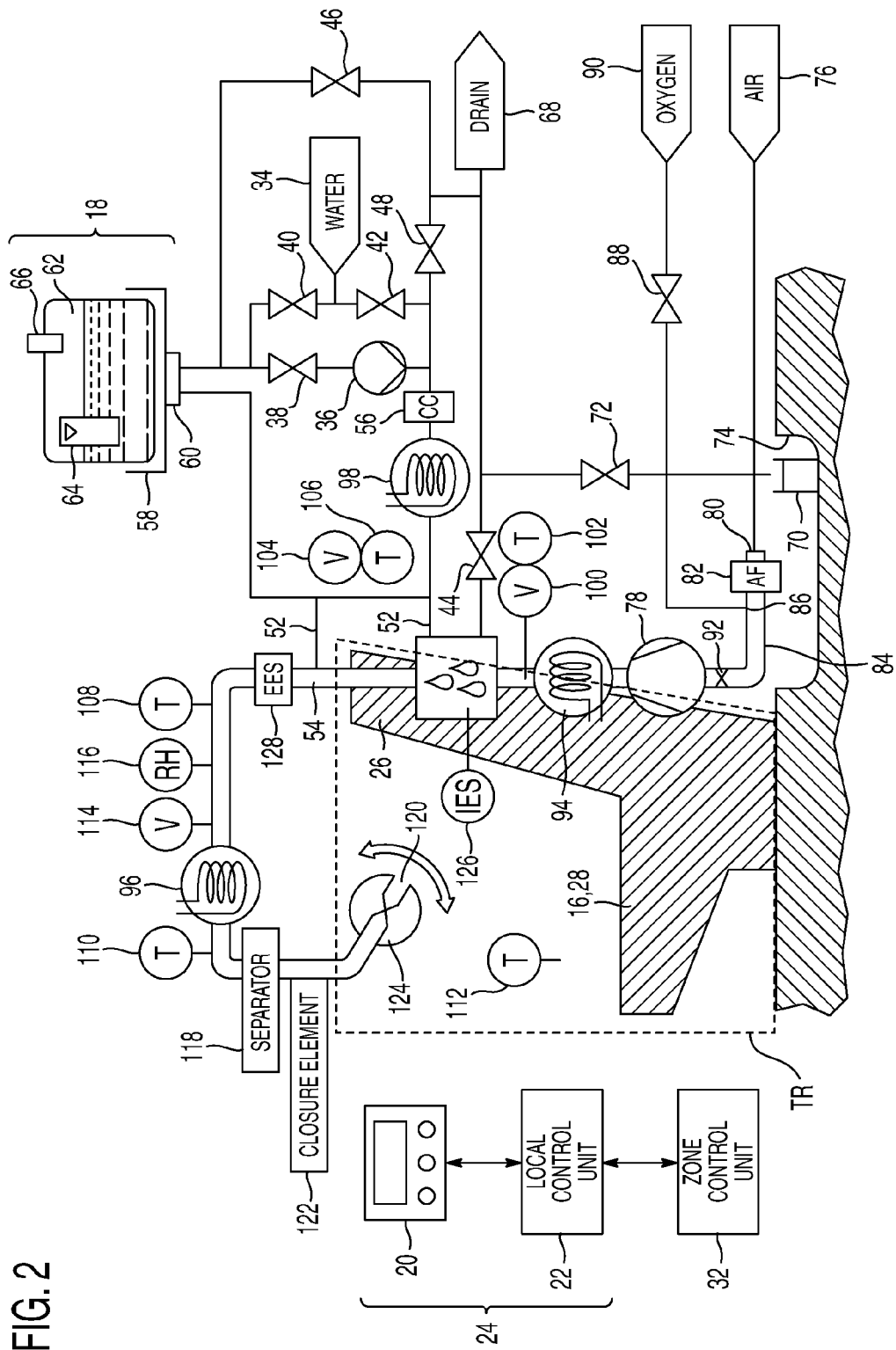

An evaporating section can be provided downstream of the humidifying unit. The evaporating section can have an S geometry, heating means, mixing fittings, swirling surfaces or separating surfaces, which serve for dissolving or separating any aerosol particles. As a result of the reduction of aerosol particles in the expelled air, the flying comfort can be further improved or germ formation prevented.

The gaseous water can be delivered in at least some of the humidifying units through the following: a membrane module, preferably a hollow-fiber membrane module; a pad evaporator; an evaporator electrically heated by trim air or bleed air, preferably having an evaporator plate; and an ultrasonic evaporator. As a result of operating temperatures markedly below the boiling point, for example in the range of 20-40° C., a membrane module can advantageously be used to eliminate a risk of scalding. Generally, from the point of view of safety, humidifying means with a lower temperature in the supplied air stream of the humidifying unit are advantageous. For example, humidifying means which supply a heat, corresponding to an evaporation enthalpy, to the water rather than to an air stream. As a result of the higher operating temperature, the use of a pad evaporator or a heated evaporator can be advantageously utilized for killing germs. An ultrasonic evaporator can be used to achieve a higher energy efficiency and given appropriate frequency selectioncan have a germicidal effect.

The device for increasing the air humidity can furthermore have an oxygen source and an inlet opening, arranged downstream of at least some of the humidifying units. Oxygen or oxygen-enriched air from the oxygen source can be blown into the supplied air stream through the inlet opening. As a result, the oxygen partial pressure, which in flight corresponds typically to a geostatic altitude of about 2000 m, can be increased, for example until an oxygen partial pressure corresponding to sea level is reached. This can improve the well-being, in particular, of persons with a reduced capacity for oxygen uptake. In addition, efficient use of the oxygen source can take place owing to the targeted air supply.

BRIEF DESCRIPTION OF THE DRAWINGS

These and other features of a device for increasing the air humidity are explained in more detail in the following description of embodiments for the purpose of illustrating and without restricting the inventive idea. In the figures:

FIG. 1 shows a schematic plan view of a seat arrangement in the “first class” of an aircraft with two embodiments of a device for increasing the air humidity; and FIG. 2 shows a more detailed schematic representation, limited to one seat, of a further embodiment of a device for increasing the air humidity.

DETAILED DESCRIPTION

FIG. 1 shows a cabin section, generally designated 10, which is configured as "first class" in an aircraft. In the example shown, the cabin section 10 has two rows of seats. For the first row of seats, a first embodiment 12 of the device for increasing the air humidity is shown. An alternative embodiment 14 is realized for the second row of seats. The seats 16 of the first row are assigned in each case a local water source 18. Mounted within hand's reach of each seat is a display and input instrument 20 which is connected to a local control unit 22. In the illustrated exemplary embodiments 12 and 14, the display and input instrument 20 is combined with the control unit 22 in an integrated control unit 24. In addition, a humidifying unit 26 is integrated in the seats 16. While the seats 28 of the second row also have an integrated humidifying unit 26, the supply thereof is combined by a central water source 18 for the entire second row 14.

While the humidifying units 26 and local controls 22 are provided for local and individual air conditioning, a global air conditioning system (not shown) is still available for air conditioning of the entire cabin section 10. Through this system, a separate supply air stream is blown in along the side walls 30. A zone control unit 32 is provided for regulating the global air conditioning system of the cabin section 10. The zone control unit 32 is connected to temperature and air humidity sensors (not shown) for detecting average atmospheric environment variables in the cabin section 10.

The water sources 18 are dimensioned for a water consumption arising due to the humidifying units 26 during a long-distance flight. Calculations show that, for a long-distance flight (of approximately 15 hours), the individual water sources 18 on the seats 16 of the first row 12 should have a capacity of three liters. The central water source 18 of the second row of seats 14 has a corresponding multiple capacity. The actual water demand also varies depending on a basic humidity in the cabin region 10.

FIG. 2 shows a schematic representation of individual components which can be fully or partially realised or combined for various further embodiments.

In one embodiment, which corresponds to the first row of seats 12, the local water source 18 shown in FIG. 2 is mounted on the seat 16. In the case of the second row of seats 14, the water is delivered to the seat 28 by the external water source marked by reference numeral 34. The water is delivered to the humidifying unit 26 by a pressure difference in the external water source 34, by the gravitational force of an overhead-located local water source 18 or by a pump 36.

Depending on the humidifying unit used, the water can be continuously or discontinuously metered using the pump 36 and the valves 38, 40 or 42. By closing the valve 48, with the valves 44 and 46 open, a circulating operation is also possible in which the pump 36 continuously delivers water through the humidifying unit 26, where appropriate also through the local water source 18. That is to say the water circulates. For pressure equalisation, the local water source 18 is connected via lines 52 to the air line 54 and the humidifying unit 26.

A conditioning component 56 is arranged upstream of the humidifying system 26 for the treatment of the supplied water. In a simple embodiment, a filter is inserted in the conditioning component 56 (labeled "CC" in FIG. 2 also). In a further embodiment, the conditioning component 56 comprises an ion exchanger or membranes for reverse osmosis, which serve for the softening of the water. For disinfection of certain components of the humidifying system, disinfectants, for example silver ions for disinfection of air lines and aerosol filters, are contained in the conditioning component 56. In a comprehensive embodiment, the conditioning component 56 has a light source in the ultraviolet spectral region, which is directed at the water flowing through to kill any pathogens contained therein. Finally, the conditioning unit 56 has a mount (not shown) for accommodating smaller vessels with aromatizing substances which are added to the water flowing past.

The local water source 18 comprises a holder 58 with a coupling 60 located at the bottom thereof. A water tank 62 with an outlet opening engages in the coupling 60 when the water tank 62 is inserted into the holder 58. The coupling 60 allows a quick change of the water tank 62 prior to a flight. The outlet opening of the water tank has a closure element (not shown) which by insertion into the coupling 60 is automatically moved to an open position and closes again automatically upon removal. The water tank 62 has a window 64, through which the level can be read. In a further embodiment, a float is integrated in the water tank as the level meter 64, the level of the float being detected mechanically or inductively and displayed by a display instrument (not shown) accessible to the flight attendants.

A preferred embodiment of the water tank contains sterile water and is hermetically sealed by a seal at the outlet opening, the seal being broken open by the coupling piece 60 during insertion of the water tank 62 into the holder 58. An alternative embodiment has an opening 66 for filling up the water tank 62.

Salts dissolved in the water reduce an evaporation rate. Therefore, demineralised water should be used. This also avoids concentration, which would necessitate a regular cleaning operation in which up to 30% of the water would have to be discarded depending on the process. This would also require drainage, which in turn could make necessary a connection to an on-board drainage system. For this reason too, demineralised water should be used for the benefit of modularity and to reduce maintenance expenditure.

By opening the valve 40 and closing the valve 38, the water tank 62 can also be filled by the external water source 34, for example a fresh water system of the aircraft, in the state when installed in the holder 58.

The external water source 34 can, as shown in the exemplary embodiment of the second row 14 in FIG. 1, be fed by a common source 18. Alternatively, a connection to the aforementioned fresh water system of the aircraft is realised. It is furthermore advantageous, in the case of an on-board hydrogen fuel cell for generating electrical energy, for water arising during the power generation to be used as an external water source 34. Finally, a condensate which condenses on a separator (not shown) from the cabin air, is another external source 34 for the humidifying system.

A drain 68 is provided to discharge waste water or excess water from the humidifying system. Excess water is emptied from the water tank 62 through the drain 68 by opening the valve 46. Correspondingly, by opening the valve 48 with the valves 38 and 42 closed, water is also discharged from the conditioning component 56, for example for drying and sterilizing the conditioning component 56. Waste water from the humidifying unit 26 can likewise be discharged through the open valve 44.

In an alternative embodiment, a collecting receptacle 70, as shown in FIG. 2, is mounted on the cabin floor to perform a drainage function in the open state of a valve 72. A collecting tank 74 encompasses the collecting receptacle 70 in order to receive water escaping in the event of an overflow of the collecting receptacle 70, a malfunction or a leak of the humidifying system. To retain the water, at least the collecting receptacle 70 is equipped with an absorbent material.

In a first exemplary embodiment, the air stream to be humidified is provided by a separate aircraft air conditioning system, shown symbolically in FIG. 2 by reference numeral 76. In an alternative embodiment, a blower 78 is mounted on the seat 16 and 28 to deliver cabin air into the humidifying system through an intake opening 80.

An air filter 82 (labeled "AF" in FIG. 2) cleans suspended particles from the air flowing into the local humidifying unit to prevent soiling of the humidifying system and therefore reduce both the maintenance expenditure and the risk of microbial contamination of the humidifying system. The air filter 82 is preferably a HEPA filter (High Efficiency Particulate Air filter) for filtering suspended matter. Condensed water which may arise on the air side of the humidifying system is led through drainage holes 84 into the collecting tank 74.

FIG. 2 shows an inlet opening 86, through which oxygen or oxygen-enriched air from an oxygen source 90 is blown into the supplied air stream with the valve 88 open. This increases the oxygen content of the locally blown-in air in the breathing region of passengers to increase comfort or, preferably, for medical reasons. For example, an oxygen concentration is set which corresponds in the breathing region to the oxygen concentration at sea level. The inlet opening 86 is advantageously arranged upstream of the humidifying unit 26, since admixing downstream of the humidifying unit 26 would affect the relative air humidity of the humidified air stream. Preferably, the inlet opening 86 is provided with a connection which is compatible with standardised medical connections for oxygen.

According to a further embodiment, a seat with the aforementioned oxygen enrichment is specifically designed for transporting sick persons and has not only an oxygen connection but also standardised connections for power supply of medical equipment.

For the schematically shown oxygen source 90 in FIG. 2, pressure vessels, or preferably for avoidance of the hazard potential of a pressure vessel, chemical oxygen generators are used. In a further embodiment, which comprises a system for fuel tank inerting, oxygen-enriched air arising during the production of a protective gas introduced into the tank is used as the source 90.

An exchangeable or variable restrictor 92, as shown in FIG. 2, is inserted in the cross-section of an incoming air line. The amount of air required for local humidification depends on the air flows in the cabin and therefore varies for different seat positions in the cabin. By means of the restrictor 92, the air stream is adapted to the seat position in the cabin. In an extended embodiment, the variable restrictor is controlled in dependence on an oxygen partial pressure, for example by the local control 22, since this pressure varies with flight altitude and the number of passengers. Here, the control 22 takes account of maximum values for the oxygen concentration, so that fire-provoking oxygen concentrations are excluded, Regardless of the detailed design of the humidifying system 26, for enrichment of the supplied air with gaseous water the evaporation enthalpy necessary for the evaporation of liquid water must be produced. The schematically represented embodiment in FIG. 2 provides, for this purpose, a heater 94 in the incoming air stream, a heater 96 in the outgoing air stream and a heater 98 in the water intake. In an alternative exemplary embodiment, the heater is mounted on the water reservoir 18 instead of on the water intake. As will be gathered from the following explanations of the humidifying unit 26, simplified embodiments dispense with individual heaters.

The air stream supplied to the humidifying unit 26 is detected with regard to its flow rate by the flow sensor 100, and with regard to its temperature by the temperature sensor 102. Similarly, flow rate and temperature of the water intake are detected before the humidifying unit 26 by the sensors 104 and 106. Two other temperature sensors 108 and 110 are mounted before and after the outgoing air stream heater 96, respectively. Finally, a temperature sensor 112 is arranged in a target TR region of the local humidification, to detect the local temperature in the region of the seat 16 or 28. Exemplary target regions TR around a seat 16, 28 are shown in phantom in FIGS. 1 and 2. Downstream of the humidifying unit 26 there are furthermore provided an air flow sensor 114 and an air humidity sensor 116 for determining the relative air humidity. Some of the signals of the sensors 100 to 116 are passed through appropriate cabling to the local control unit 22. Some of the temperature and flow sensors do not serve for continuous regulation but to block the operation of heaters and humidifying units if there is not a sufficient flow. Water accumulation and overheating is thus precluded. The local temperature 112 is detected in order to set the air temperature of the humidified air 110 appropriately and to ensure that it does not fall below the dew point. Corresponding saturation curves are tabulated for this purpose in the control unit 22.

In an alternative embodiment, control functions for the operation of the humidifying unit 26 are performed by a humidification control (not shown) integrated in the humidifying unit 26. In a reduced embodiment, individual flow sensors are dispensed with by mounting and pre-adjusting adjustable restrictors in the cross-sections.

The humidified air passes through a separator 118 which retains the liquid water (especially perceptible droplet sizes, including water vapour). This ensures that finally only the humidified air escapes into the cabin region through an outlet opening 120. Before the outlet opening 120, a closure element 122 manually actuable by the passenger is furthermore mounted, so that the air outlet can be completely closed if desired. For comfort reasons, preferably an outlet geometry of the outlet opening 120 is chosen which produces the low air flow velocities and low turbulence.

By means of a joint 124, the outlet opening 122 can be manually oriented by the passenger. In a further embodiment, the position of the outlet opening is furthermore mounted movably along a rail (not shown) in a ceiling covering located above the seat 16 or 28. In a further embodiment, electromechanical or hydraulic actuating mechanisms are provided which act on the joint 124 to automatically adjust the orientation of the outlet opening 120 to a position of the backrest of the seat 16 or 28. The adjustment is achieved via a mechanical or hydraulic coupling or an electronic control (not shown). In the aforementioned embodiment, which provides for positioning of the outlet opening 120 along the rail, the actuating mechanisms for adjusting the positioning of the outlet opening 120 are installed along the rail behind the ceiling covering.

The central element of the humidifying system shown in FIG. 2 is the humidifying unit 26. As stated above, the humidifying unit 26 is supplied with liquid water and an air stream to be humidified. Preferably, the humidifying unit 26 is provided with a liquid sensor which collects information about an amount of water in the humidifying unit 26 and sends it to the local control unit 22. Because of the importance of the humidifying unit 26 to the humidifying system, five embodiments of the humidifying unit 26 will be explained below in more detail.

According to a first embodiment, a membrane module with membranes made of a material impermeable to liquid water, but permeable to gaseous water is provided in the humidifying unit 26. The membrane module has a plurality of membrane fibres which are hollow, so that the supplied, liquid water can flow through the fibres in the longitudinal direction. The interior of the hollow-fibre membranes defines a first volume and the exterior of the hollow-fibre membranes defines a second volume of the membrane module. In the membrane module, the hollow-fibre membranes are enclosed substantially in parallel and without prestress in the second volume. For an illustration, reference is made to the (single) figure of U.S. Pat. No. 4,098,852. As a result of the flow through the hollow-fibre membranes, they extend substantially along their longitudinal direction. Since the hollow-fibre membranes are firmly enclosed at their ends in the second volume, owing to the extension a slight curvature of the hollow-fibre membranes within the second volume occurs, without thereby their function being impaired. In a subsequent, dried state, the hollow-fibre membranes reversibly return to the original state, with the result that at no time are mechanical stresses transmitted to the membrane module. This has a beneficial effect on the service life, especially in relation to sheet membrane modules.

The hollow-fibre membranes separate, with their cylindrical walls, the first and second volume, so that a mass transfer from one into the other is possible only through the fine-porous membrane material. In the above-described embodiment, a portion of the water flowing through the hollow fibres diffuses from the first volume into the second volume. As a result, a water-enriched air phase is obtained in the second volume. In a second preferred embodiment of the hollow-fibre membrane module, the second, outer volume of the membrane module is filled with water, while the air to be humidified flows through the first, inner volume of the hollow-fibre membranes axially.

The membrane humidifier can either be operated such that substantially only the amount of water transferred by the phase transition into the air to be enriched is replaced (so-called "dead-end" method), or by the pump 36 pumping water in a circulating manner through the hollow-fibre membranes (so-called "cross-flow" method). With the latter variant, longer service lives of the membrane and better humidification performance can be achieved. One reason for this is that the water flowing past the membrane walls prevents a deposition of suspended particles, and thus a rapid blocking of the porous membrane wall.

Advantageously the selective mass transfer of the water through the membrane also prevents microorganisms, dissolved solids or other impurities in the water from passing into the air stream. Fouling of the hollow-fibre membrane surfaces with microorganisms is achieved by completely drying the membrane, preferably towards the end of the flight.

The evaporation rate of the humidifying unit with hollow-fiber membranes depends on the temperatures of the supplied water and the air stream, and also the pressure difference between the liquid water and the air phase. As long as the air temperature does not fall below the water temperature, only gaseous water in the membrane module will get into the air. Complex regulation which matches, as a function of the desired relative air humidity, the amount of water converted to the flow rate of the air stream to be humidified can therefore be omitted in a simplified embodiment. Owing to the hollow-fiber membranes, the number of aerosol particles in the humidified air stream is already so low that an integrated evaporation section 126 shown in (labeled "IES" in FIG. 2) and an external evaporation section 128 (labeled "EES" in FIG. 2) downstream of the humidifying unit 26 can be dispensed with.

A remarkable advantage of the membrane module is its low operating temperature. As previously mentioned in connection with the heaters, the evaporation enthalpy $\Delta H$ must be produced proportionally to the amount of water converted into the gas phase. This corresponds to a temperature change $\Delta T=\Delta H/C$, where C is the heat capacity of that phase from which the evaporation enthalpy is withdrawn. In the case of the membrane module, this is the heat capacity of the liquid water $C=C_{water}$, preferably circulating in the "cross-flow" method. In contrast, in a humidifying unit operated by heated air, $C=C_{air}$ is the heat capacity of the air. Since $C_{air} \ll C_{water}$, the temperature change $\Delta T_{water}$ of the water is considerably less than that of the air: $\Delta T_{air} \gg \Delta T_{water}$. In fact, with recirculation ("cross-flow" method), a heating of the water by only $\Delta T_{water}=3°$ C. is sufficient. Accordingly, the operating temperature of the membrane module is also between 20° and 70° C., preferably only between 20° and 40° C. The actual temperatures depend greatly on an input and output humidity. An additional factor is the flow rate of the water in recirculating systems. By comparison, estimates show, on realistic assumptions for a humidifying system based on air preheating, an air temperature of approximately 70° C.

A second embodiment of the humidifying unit 26 uses an evaporator in which a reserve of water is heated above the boiling point and the resulting water vapour is introduced into the air stream to be humidified. The evaporator tank has a volume which is heated electrically or by heat transfer from bleed air or trim air. The supplied liquid water is introduced into this evaporation tank. To achieve an even distribution of the vapour in the air to be humidified, the water vapour is mixed by a nozzle with the dry incoming air. The evaporator is regulated so that condensation by supersaturation of the air stream to be humidified does not occur. As a result, an evaporation section can be dispensed with.

The use of the evaporator prevents microorganisms, dissolved solids or other impurities in the water from getting into the humidified air stream. Since the water is supplied to the air stream already in gaseous form, no evaporation section is required. Moreover, in a simplified embodiment, an additional heating of the humidified air stream by the heater 96 can be dispensed with. This allows a space-saving overall system.

A third embodiment of the humidifying unit 26 comprises an evaporator plate, with the supplied liquid water being dripped onto the heated surface of the evaporator plate and evaporated there in order to be supplied in the gaseous state to the air stream to be humidified. The evaporator plate is preferably electrically heated, in alternative embodiments by bleed air or trim air.

Analogously to the aforementioned embodiment of an evaporator, the gas phase of the water provided by the evaporator plate is mixed by a nozzle with the dry air. The aforementioned advantages with regard to the killing of microorganisms and the retention of other impurities in the water as previously mentioned for the evaporator also apply to the embodiment with an evaporator plate. In addition, an evaporation section and a heating of the humidified air stream can also be dispensed with, resulting in a space-saving overall system.

A fourth embodiment of the humidifying unit 26 uses a pad evaporator. Such a pad is provided, for example, by a sponge-like silicate fibre structure. Into this is led the air which is to be humidified and which is preheated by means of the heater 94 to approximately 70 to 80° C. The air flows through the fibrous pad, in which the supplied water adheres by capillary action to the entire surface of the fibres over a large area in order to effectively pass into the flow-through air as gaseous water.

A fifth embodiment of the humidifying unit 26 provides for introducing water-containing aerosol produced via an ultrasonic bath, together with the supplied air, into an integrated evaporation section 126. By appropriate mixing fittings in the evaporation section, turbulence of the aerosol with the supplied air occurs, with the result that the evaporation enthalpy necessary for the evaporation of the aqueous aerosol particles is withdrawn from the supplied air. Any aerosol particles remaining are removed from the humidified air stream by the droplet separator 118. The separator 118 is preferably designed so that separated water is retained in it in order, in time, nevertheless to evaporate in the humidified air stream. This is efficient and saves a water drain.

In addition to the aforementioned embodiments of the humidifying unit 26, other humidifying devices already known to a person skilled in the art may be realised in the humidifying unit 26.

To regulate the individual components of the humidifying system which have been explained, the local control unit 22 is employed. The local control unit 22 receives the aforementioned signals of the sensors 100 to 116, and furthermore controls the power of the blower 78, of the heaters 94, 96 and 98, and also of the humidifying unit 26 and of the pump 36. For this purpose, a local temperature and a local air humidity are determined by the local control unit from the detected variables of the sensors and are displayed on the display and input instrument 20 connected to the local control unit 26 to be retrievable by the passenger. In a simple embodiment, the display and input instrument 20 has rotary knobs in order to preset a desired temperature or relative air humidity. In a preferred embodiment of the display and input instrument 20, the input is provided by a touch screen (not shown) with corresponding graphically represented input options. Here, the input option is a menu item of the in-flight entertainment system. The preset temperature and relative air humidity are compared by the local control unit 22 with the corresponding detected variables. In the event of deviations which exceed a preset regulating range, the controlled components are regulated so that they counteract the deviations.

A further advantage results from a combined regulation of temperature and air humidity by the local control unit 22 with the proviso of an individual temperature control of the air. The temperature preset on the display and input instrument 20 is regulated while taking account of the evaporation enthalpy withdrawn by the evaporation. For example, to improve energy efficiency, use is made of the fact that cooler air is provided in the course of the humidification of the air. At the same time, the comfort of the persons for whom the global temperature setting is not pleasant is further increased.

In addition, the local control unit 22 is connected to the zone control unit 32 for data communication. By means of the data communication, the local control units marked with reference numeral 24 in FIG. 1 transmit the detected local temperature together with the preset temperature to the zone control unit 32. The latter calculates, from the received detected and preset variables, average values for the entire cabin region 10. The average values are used by the zone control unit 32 as measured or desired values for control of the separate global air conditioning system of the cabin region 10. By this data communication, the energy consumption for air conditioning of the cabin region 10 is advantageously optimised while maintaining the individual regulability.

Via another global display and input device (not shown) which is accessible to a cabin crew, global presettings for the individual seats, especially the local air humidity, can be provided. This is useful since the local air humidity is perceived by some passengers not as sufficiently clearly as would be necessary for independent regulation. In a simplified embodiment, the local display and input instrument 20 may be limited to a choice of temperature, while the local air humidity is chosen by the cabin crew on the global display and input instrument. For a given local temperature, the humidifying unit is then typically controlled so that a relative air humidity between 90 and 100% is achieved at the outlet opening 120.

For adjustment of the outlet openings 120 of the whole system (outside of the regular operation), the closure 122 can also be removed without tools. This results in an opening through which visualisation means, for example the mist of a mist generator, can be introduced. This allows the outflow behaviour behind the outlet opening 120 to be visualised. For adjustment, an adjusting program in the local control unit 22 can be called that passes through different temperature ranges. As a result, the adjustment can also take account of deviations in the outflow behaviour due to thermal convection or density differences between cabin air and air stream. Finally, through the mist visualisation it is possible in a simple manner to adjust the joint 124 or the actuating mechanism acting on the joint 124 and the associated control with regard to the position of the seat 16 or 28.

Another advantage of the described local humidifying system 12 with the water tank 62 and blower 78 integrated in the seat 16 is its modular construction. The humidifying system is thus easily retrofitted in existing aircraft, for example by replacing individual seats. Moreover, the configuration flexibility of the cabin is not limited by the modular and integrated construction.

The invention claimed is:

1. A device for increasing the air humidity in a cabin region of an aircraft equipped with a plurality of seats, comprising:
   a plurality of humidifying units, each of which is arranged in spatial association with a partial number of the plurality of seats defining corresponding target regions for local air humidification in the cabin region and each of which selectively enriches a supplied air steam with gaseous water,
   a plurality of outlet openings which are designed to emit the air streams enriched with gaseous water by the humidifying units into the corresponding target regions of the cabin region, wherein a partial number of the outlet openings each receives one of the enriched air streams such that each of the plurality of humidifying units is associated with a partial number of the outlet openings,
   a plurality of temperature sensors, each of which is arranged in associated ones of the target regions and each of which detects a local temperature in the associated target region, and
   a plurality of first control units, each of which is electrically connected to one of the plurality of temperature sensors and each of which controls an air temperature of the enriched air stream so that the detected local temperature in the target region does not fall below a dew point in the target region.

2. The device of claim 1, wherein at least some of the humidifying units are arranged in or on associated ones of the plurality of seats.

3. The device of claim 1, wherein at least some of the outlet openings are arranged on associated ones of the plurality of seats or in a surrounding area accessible to associated ones of the plurality of seats by convection.

4. The device of claim 1, wherein a partial number of the humidifying units are each assigned a water reservoir, from which the humidifying units draw water for enriching the air streams.

5. The device of claim 4, wherein at least some of the water reservoirs are arranged removably in or on associated ones of the plurality of seats.

6. The device of claim 1, wherein a partial number of the humidifying units are each assigned a blower which serves for generating the air stream supplied to the associated humidifying unit, wherein at least some of the blowers are each arranged in or on associated ones of the plurality of seats.

7. The device of claim 1, wherein at least some of the outlet openings can be individually positioned or individually oriented at a joint, and wherein a controlled actuator mechanism is provided at the joint, which allow the position or orientation of at least one of the outlet openings to adjust automatically to a position of a backrest of one of the plurality of seats.

8. The device of claim 1, further comprising:
at least one heater configured to heat at least one of the following phases: supplied air stream, enriched air stream and supplied water.

9. The device of claim 8, further comprising:
at least one sensor that detects at least one of the following variables temperature, air humidity, flow rate, pressure and oxygen content of at least one of the following phases: supplied air stream, enriched air stream, air stream at one of the outlet openings, supplied water and air in a surrounding area accessible to one of the seats by convection.

10. The device of claim 9, wherein the first control units are further designed to compare the at least one detected variable with at least one preset variable and to counteract deviations by regulating at least one of the humidifying units or the at least one heater.

11. The device of claim 10, wherein the first control unit is configured for data communication with a separate second control unit, which serves for controlling a global air conditioning system for air conditioning supply air separate from the enriched air streams and blown into the entire cabin region, the first control unit being configured to transmit the at least one detected variable or the at least one preset variable and configured to receive from the second control unit measured or desired values concerning the air conditioning of the supply air and then correct the at least one preset variable in dependence on the values received from the second control unit.

12. The device of claim 1, wherein an evaporating section downstream of the humidifying unit includes heating devices, mixing fittings, swirling surfaces or separating surfaces, which serve for dissolving or separating aerosol particles.

13. The device of claim 1, wherein the gaseous water is conveyed in at least some of the humidifying units through at least one of the following: a membrane module, a hollow-fiber membrane module; a pad evaporator; an evaporator electrically heated by trim air or bleed air, having an evaporator plate; and an ultrasonic evaporator.

14. The device of claim 1, further comprising:
at least one oxygen source and an inlet opening, arranged upstream of at least some of the humidifying units, for blowing oxygen or oxygen-enriched air from the oxygen source into the supplied air stream.

15. The device of claim 14, further comprising:
at least one standardized connection for medical oxygen, which is connected to the at least one oxygen source and mounted on or in the vicinity of at least a partial number of the plurality of seats.

* * * * *